(12) United States Patent
Yan

(10) Patent No.: US 12,325,027 B2
(45) Date of Patent: Jun. 10, 2025

(54) DEVICE FOR TREATING MICROFLUIDIC SAMPLE

(71) Applicant: HEMOSMART MEDICAL TECHNOLOGY LTD., Kunshan (CN)

(72) Inventor: Jing Yan, Kunshan (CN)

(73) Assignee: HEMOSMART MEDICAL TECHNOLOGY LTD., Kunshan (CN)

( * ) Notice: Subject to any disclaimer, the term of this patent is extended or adjusted under 35 U.S.C. 154(b) by 762 days.

(21) Appl. No.: 17/597,143

(22) PCT Filed: Aug. 18, 2020

(86) PCT No.: PCT/CN2020/109783
§ 371 (c)(1),
(2) Date: Dec. 27, 2021

(87) PCT Pub. No.: WO2021/032082
PCT Pub. Date: Feb. 25, 2021

(65) Prior Publication Data
US 2022/0314227 A1 Oct. 6, 2022

(30) Foreign Application Priority Data
Aug. 19, 2019 (CN) .......................... 201910762382.4

(51) Int. Cl.
*B01L 9/00* (2006.01)
*B01L 3/00* (2006.01)
(Continued)

(52) U.S. Cl.
CPC ............. *B01L 9/527* (2013.01); *B01L 3/0275* (2013.01); *G01N 35/1002* (2013.01);
(Continued)

(58) Field of Classification Search
CPC .. B01L 9/527; B01L 3/0275; B01L 3/502715; B01L 2300/0832;
(Continued)

(56) References Cited

U.S. PATENT DOCUMENTS

2004/0241872 A1* 12/2004 Wegrzyn ................. B01L 3/021
436/171
2008/0257073 A1   10/2008 Tajima
(Continued)

FOREIGN PATENT DOCUMENTS

| CN | 101076732 A | 11/2007 |
| CN | 108479874 A | 9/2018 |

(Continued)

OTHER PUBLICATIONS

International Search Report and Written Opinion issued in International Patent Application No. PCT/CN2020/109783; mailed Nov. 19, 2020; 19 pgs.

*Primary Examiner* — Jennifer Wecker
*Assistant Examiner* — Britney N. Washington
(74) *Attorney, Agent, or Firm* — HAUPTMAN HAM, LLP

(57) ABSTRACT

A microfluidic sample processing device, capable of automatically processing a microfluidic sample, comprises: a tray apparatus, for accommodating a reagent and a chip clamp for mounting a microfluidic chip; a mechanical arm, having a connecting head for connecting the chip clamp, a gas flow channel for communicating with an inner cavity of the chip clamp being arranged in the connecting head; a negative pressure suction apparatus, for providing negative pressure to the gas flow channel of the connecting head; a lifting apparatus, for driving the connecting head to rise and fall; and a translation apparatus, for driving the connecting head to move to above the chip clamp or above the reagent; wherein, the tray apparatus is positioned below the mechani- (Continued)

cal arm, and the mechanical arm is arranged on the translation apparatus and is connected to the lifting apparatus.

18 Claims, 12 Drawing Sheets

(51) Int. Cl.
    *B01L 3/02*     (2006.01)
    *G01N 35/04*     (2006.01)
    *G01N 35/10*     (2006.01)

(52) U.S. Cl.
    CPC . *B01L 3/502715* (2013.01); *B01L 2300/0832* (2013.01); *B01L 2400/0487* (2013.01); *G01N 2035/0479* (2013.01)

(58) Field of Classification Search
    CPC ..... B01L 2400/0487; B01L 2300/0816; B01L 2400/049; B01L 3/5027; B01L 3/56; G01N 35/1002; G01N 2035/0479; G01N 33/531; G01N 33/541; G01N 33/5436; G01N 35/04; G01N 35/1009
    See application file for complete search history.

(56) References Cited

U.S. PATENT DOCUMENTS

| | | |
|---|---|---|
| 2010/0119416 A1 | 5/2010 | Tajima |
| 2013/0032249 A1* | 2/2013 | Tajima ................. G01N 35/10 |
| | | 141/250 |
| 2013/0132006 A1* | 5/2013 | Gwynn ................. B01L 3/021 |
| | | 702/55 |

FOREIGN PATENT DOCUMENTS

| | | |
|---|---|---|
| CN | 110501488 A | 11/2019 |
| CN | 110538679 A | 12/2019 |
| CN | 110538680 A | 12/2019 |
| CN | 110624613 A | 12/2019 |
| CN | 210442525 U | 5/2020 |
| CN | 210613748 U | 5/2020 |
| CN | 210613766 U | 5/2020 |
| IN | 210613743 U | 5/2020 |

\* cited by examiner

DEVICE FOR TREATING MICROFLUIDIC SAMPLE

CROSS REFERENCE TO RELATED APPLICATION(S)

The present application is a U.S. National Phase of International Application Number PCT/CN2020/109783, filed Aug. 18, 2020, and claims priority from Chinese Patent Application No. CN 201910762382.4 filed on Aug. 19, 2019.

TECHNICAL FIELD

The present disclosure belongs to the field of bio-detection technology, and relates to a microfluidic sample processing device.

BACKGROUND

Microfluidic technology is an important method for sorting and analyzing cells or biomolecules, such as capturing circulating tumor cells (CTC), and has the advantages of simple operation and small amount of antibody required. The microfluidic chip is the core component of the microfluidic technology, and the microfluidic chip has a microfluidic channel and is attached with specific antibodies to trap and capture the target cells or biomolecules in the sample flowing through. These captured cells or biomolecules are often needed to undergo a series of post-processing before they can be used for analysis, such as washing, primary or secondary antibody treatment, and staining. At present, these processing are mostly performed manually, which is cumbersome and inconvenient to operate, low in efficiency, and with low degree of automation.

SUMMARY

The present disclosure is aimed to provide a microfluidic sample processing device, which is capable of automatically processing a microfluidic sample.

An aspect of the present disclosure provides a microfluidic sample processing device, comprising:
- a tray apparatus, for accommodating a reagent and a chip clamp for mounting a microfluidic chip;
- a mechanical arm, having a connecting head for connecting the chip clamp, a gas flow channel for communicating with an inner cavity of the chip clamp being arranged in the connecting head;
- a negative pressure suction apparatus, for providing negative pressure to the gas flow channel of the connecting head;
- a lifting apparatus, for driving the connecting head to rise and fall to connecting the chip clamp or make the chip clamp insert into or separate from the reagent; and
- a translation apparatus, for driving the connecting head to move to above the chip clamp or above the reagent;
- wherein, the tray apparatus is positioned below the mechanical arm, and the mechanical arm is arranged on the translation apparatus and is connected to the lifting apparatus.

Preferably, the tray apparatus is mounted with one or more kits arranged side by side in a left-right direction, each kit comprises a kit body, and the kit body is provided with a waste liquid collection well for inserting the chip clamp and storing waste liquid and one or more reagent wells for storing reagents.

In an embodiment, the tray apparatus is provided with one or more mounting grooves arranged side by side in the left-right direction, and each mounting groove is provided with one kit.

In an embodiment, the tray apparatus comprises a bottom plate and an upper plate fixedly arranged on the bottom plate, the upper plate comprises a left-right extending portion and a plurality of front-rear extending portions extending forward from the left-right extending portion, the plurality of front-rear extending portions is arranged side by side and spaced in the left-right direction, and one mounting groove with open front and upper sides is formed between any two adjacent front-rear extending portions.

In an embodiment, each of the front-rear extending portions is provided with a slot extending in the front-rear direction, and the slots on two adjacent front-rear extending portions are arranged opposite to each other, and left and right edges of one kit are inserted into two corresponding slots.

In an embodiment, the upper plate is provided with a positioning mechanism for positioning the kit(s).

In an embodiment, the positioning mechanism comprises an upwardly extending positioning protrusion formed on the upper plate.

In an embodiment, the kit body is further provided with a chip return well for depositing the chip clamp, the tray apparatus further comprises a baffle plate, and a part of the chip return well is located directly under the baffle plate.

In an embodiment, the chip return well is a long hole or a kidney-shaped hole extending in the front-back direction.

In an embodiment, the chip clamp comprises a clamp body and a flow guide tube for liquid suction and discharge, the clamp body has an inner cavity for mounting the microfluidic chip, and the flow guide tube extends downwardly from the clamp body and communicates with the inner cavity; and the clamp body has a cylinder portion for the connecting head to insert into.

In an embodiment, the mechanical arm further comprises a housing and a lifting rod passing through the housing and capable of moving in an up-down direction, the lifting rod is hollow, and an upper end portion of the lifting rod is provided with a joint communicating with a negative pressure suction apparatus, and the connecting head is fixedly arranged at a lower end portion of the lifting rod.

In an embodiment, the lifting apparatus comprises a lifting shaft assembly driven to rotate by a lifting power mechanism, one or more circles of teeth are formed on an outer circumferential surface of the lifting shaft assembly, the lifting rod has a rack portion extending in the up-down direction, and the rack portion and the teeth on the lifting shaft assembly mesh with each other.

In an embodiment, the lifting shaft assembly comprises a lifting shaft driven to rotate by the lifting power mechanism and one or more gears rotating with the lifting shaft, the gear(s) is provided with polygonal holes, and the lifting shaft is inserted in the polygonal hole and allow the gear(s) to move horizontally relative to the lifting shaft.

In an embodiment, the gear(s) is arranged within the housing.

In an embodiment, the lifting power mechanism is a lifting motor.

In an embodiment, the translation apparatus comprises a screw rod driven to rotate by a motor, and the screw rod passes through the mechanical arm and is threaded connected to the housing of the mechanical arm.

In an embodiment, there are a plurality of mechanical arms, the plurality of mechanical arms are driven to lift synchronously by one lifting shaft, and the plurality of mechanical arms are driven to translate synchronously by one screw rod.

In an embodiment, the connecting head comprises a head body and a first and second flanges extending outwardly from an outer surface of a lower portion of the head body, and the first flange is located at a distance above the second flange.

More preferably, outer diameter of the first flange is smaller than outer diameter of the second flange.

In an embodiment, the negative pressure suction apparatus comprises a piston driven by a negative pressure motor to reciprocate in a straight line and a piston shell provided with a gas cavity, and the piston is inserted in the gas cavity of the piston shell.

In an embodiment, the negative pressure suction apparatus further comprises a gas-guide tube, one end portion of the gas-guide tube is fixedly connected to the piston shell and communicates with the gas cavity, and the other end portion of the gas-guide tube is fixedly connected to the mechanical arm.

In an embodiment, the translation apparatus comprises an x-direction assembly for driving the mechanical arm to move in the left-right direction and a y-direction assembly for driving the mechanical arm to move in the front-rear direction.

In an embodiment, the mechanical arm is arranged on the x-direction assembly, the x-direction assembly is arranged on the y-direction assembly, and the y-direction assembly is arranged on a frame.

In an embodiment, the x-direction assembly comprises a mounting plate and a screw rod extending along the left-right direction, the screw rod is rotatably arranged on the mounting plate around its own axis, and the screw rod passes through the mechanical arm and is threaded connected to the mechanical arm.

In an embodiment, the x-direction assembly further comprises an x-direction motor for driving the screw rod to rotate.

In an embodiment, the y-direction assembly comprises a sliding rail extending in the front-rear direction and a sliding block slidably disposed on the sliding rail, the sliding rail is fixedly arranged on the frame, and the x-direction assembly is arranged on the sliding block.

In an embodiment, the y-direction assembly further comprises a y-direction motor and a belt transmission mechanism driven by the y-direction motor, and the belt transmission mechanism is connected to the sliding block.

In an embodiment, the microfluidic sample processing device further comprises a fault detection apparatus.

In an embodiment, the fault detection apparatus comprises at least one detecting unit, each detecting unit comprises a pair of spaced photoelectric sensors and a baffle that moves with the mechanical arm, and the baffle is arranged between the pair of photoelectric sensors.

In an embodiment, the fault detection apparatus further comprises a controller, the controller is electrically connected to each of the photoelectric sensors, and the controller is used to control the mechanical arm to stop moving after any one of the photoelectric sensors is triggered.

In an embodiment, the fault detection apparatus further comprises a fault indicator light, the controller is electrically connected to the fault indicator light, and the controller is also used to control the fault indicator light to switch the light color after any one of the photoelectric sensors is triggered.

In an embodiment, the fault detection apparatus further comprises a sound alarm apparatus, the controller is electrically connected to the sound alarm apparatus, and the controller is also used to control the sound alarm apparatus to emit an alarm sound after any one of the photoelectric sensors is triggered.

Another aspect of the present disclosure provides a microfluidic sample processing device, comprising:
 a tray apparatus, for accommodating a reagent and chip clamps for mounting microfluidic chips;
 a plurality of mechanical arms, each having a connecting head for connecting one of the chip clamps, a gas flow channel for communicating with an inner cavity of the chip clamp being disposed in the connecting head;
 a negative pressure suction apparatus, for providing negative pressure to the gas flow channel of the connecting head;
 a lifting apparatus, for driving the connecting head to rise and fall in order to connecting the chip clamp or make the chip clamp insert into or separate from the reagent; and
 a translation apparatus, used for driving the connecting head to move to above the chip clamp or above the reagent;
 wherein, the tray apparatus is positioned below the mechanical arms, and the plurality of mechanical arms are arranged on the translation apparatus and are connected to the lifting apparatus;
 each of the mechanical arms further comprises a housing and a lifting rod passing through the housing and capable of moving in an up-down direction, the lifting rod is hollow, and an upper end portion of the lifting rod is provided with a joint communicating with the negative pressure suction apparatus, and the connecting head is fixedly arranged at a lower end portion of the lifting rod;
 the lifting apparatus comprises a lifting shaft assembly driven to rotate by a lifting power mechanism, and multiple circles of teeth are formed on outer circumferential surfaces of the lifting shaft assembly;
 the lifting shaft assembly comprises a lifting shaft driven to rotate by the lifting power mechanism and a plurality of gears rotating with the lifting shaft, each of the lifting rods has a rack portion extending in the up-down direction, one of the rack portions and one corresponding gear mesh with each other, the gears are provided with polygonal holes, and the lifting shaft is inserted in the polygonal holes and allow the gears to move horizontally relative to the lifting shaft;
 the translation apparatus comprises a screw rod driven to rotate by a motor, and the screw rod passes through the mechanical arms and is threaded connected to the housings of the mechanical arms.

Due to the use of the above solutions, the present disclosure has the following advantages over the prior art:
 the microfluidic sample processing device of the present disclosure can integrate functions of cell or biomolecule capturing, immobilization, washing, antibody incubation, staining, etc., automatically realize the above-mentioned series of processing of microfluidic samples, reduce manual intervention, and has a higher degree of automation, to improve the processing efficiency; and it has a compact structure, a reasonable layout, and reduces the space occupied by the device.

BRIEF DESCRIPTION OF THE DRAWINGS

For more clearly explaining the technical solutions in the embodiments of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

FIG. 2b is a partial enlarged view of Part A in FIG. 2a;

Wherein,

1—frame; 10—shell; 101—door;
2—kit; 20—kit body; 21—waste liquid collection well; 22—fixation solution well; 23—buffer solution well; 24—first primary antibody well; 25—second primary antibody well; 26—secondary antibody well; 27—staining solution well; 28—chip return well;
3—chip clamp; 30—clamp body; 31—flow guide tube; 32—cylinder portion;
4—tray apparatus; 40—mounting groove; 41—bottom plate; 42—upper plate; 421—left—right extending portion; 422—front—rear extending portion; 423—slot; 424—positioning protrusion; 43—baffle plate;
5—mechanical arm; 50—housing; 51—connecting head; 511—first flange; 512—second flange; 52—lifting rod; 521—rack portion; 53—joint;
6—negative pressure liquid suction apparatus; 61—negative pressure motor; 611—push plate; 62—piston; 63—piston shell; 631—gas cavity; 64—photoelectric sensor; 65—baffle;
7—lifting apparatus; 71—lifting shaft; 72—gear; 721—square hole; 73—lifting motor;
8—translation apparatus; 81—mounting plate; 811—guide rail; 82—x-direction motor; 83—screw rod; 84, y-direction motor; 85—synchronous belt transmission mechanism; 86—sliding rail; 87—sliding block;
9—fault detection apparatus; 91—first photoelectric sensor; 92—first baffle; 93—second photoelectric sensor; 94—second baffle; 95—third photoelectric sensor; 96—fault indicator light.

DETAILED DESCRIPTION OF EXEMPLARY EMBODIMENTS

In the following, the preferable embodiments of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure.

Figure 1:
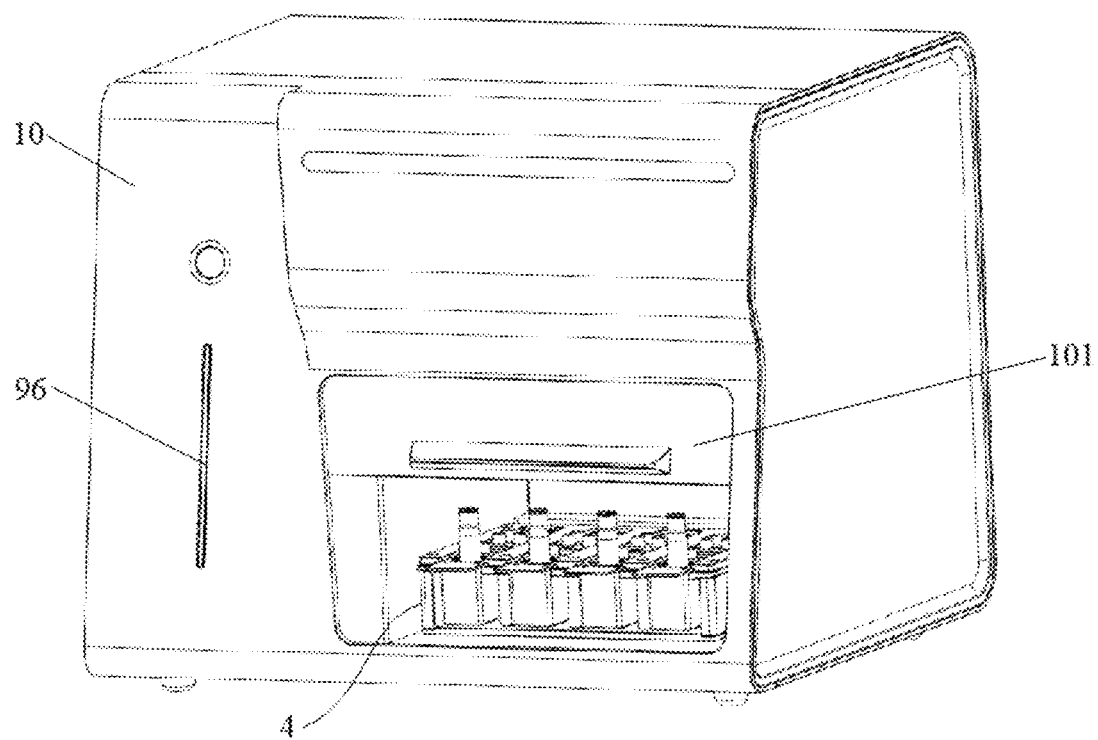
FIG. 1 is a stereogram of a microfluidic sample processing device according to an embodiment.

FIG. 1 to FIG. 11 show a microfluidic sample processing device. As show in FIG. 1 to FIG. 11, the microfluidic sample processing device mainly comprises a tray apparatus 4, a mechanical arm 5, a negative pressure suction apparatus 6, a lifting apparatus 7 and a translation apparatus 8, the tray apparatus 4, the mechanical arm 5, the negative pressure suction apparatus 6 and the translation apparatus 8 are arranged on a frame 1 of the microfluidic sample processing device, a shell 10 is provided outside the frame 1, and the above apparatuses are covered within the shell 10. Wherein, the tray apparatus 4 is used for accommodating a reagent and a chip clamp 3 for mounting a microfluidic chip; the mechanical arm 5 has a connecting head 51 for connecting the chip clamp 3, a gas flow channel for communicating with the inner cavity of the chip clamp 3 is disposed in the connecting head 51; the negative pressure suction apparatus 6 is used for providing negative pressure to the gas flow channel of the connecting head 51; the lifting apparatus 7 is used for driving the connecting head 51 to rise and fall in order to connecting the chip clamp 3 or make the chip clamp 3 insert into or separate from the reagent; and the translation apparatus 8 is used for driving the connecting head 51 to move to above the chip clamp 3 or above the reagent. The tray apparatus 4 is positioned below the mechanical arm 5, and the mechanical arm 5 is arranged on the translation apparatus 8 and is connected to the lifting apparatus 7. Specifically, the tray apparatus 4 is mounted with one or more kits 2 thereon, the chip clamp(s) 3 are stored in the kit(s) 2, and the microfluidic chip(s) are mounted in the chip clamp(s) 3 and fixed by the chip clamp(s) 3. As shown in FIG. 1, the shell 10 is opened with a door 101, the door 101 is arranged capable of sliding up and down and opposite to the trap apparatus 4, and when the door 101 is slided upward, the trap apparatus 4 is exposed, and the kit(s) 2 can be easily mounted or replaced.

Figure 3:
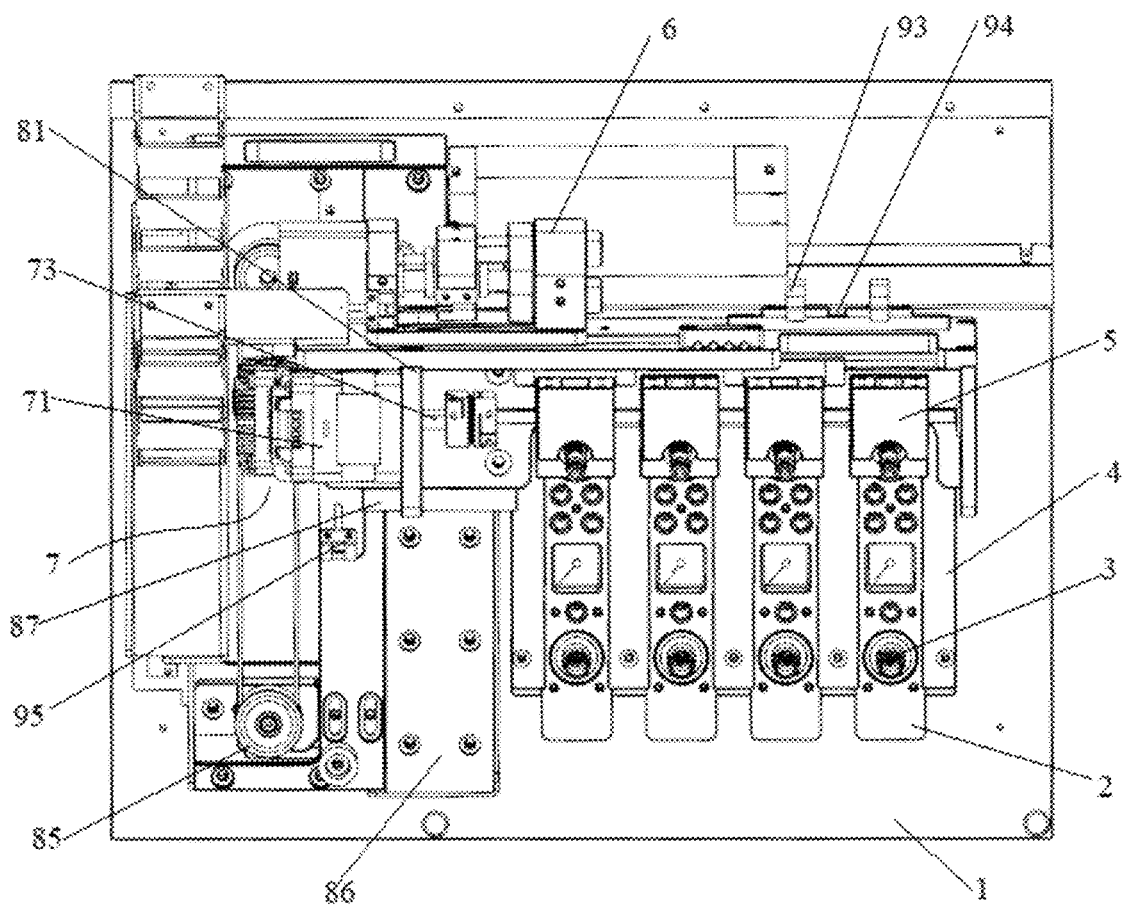
FIG. 3 is a top view of a microfluidic sample processing device according to an embodiment, wherein the shell is not shown.
Figure 5:
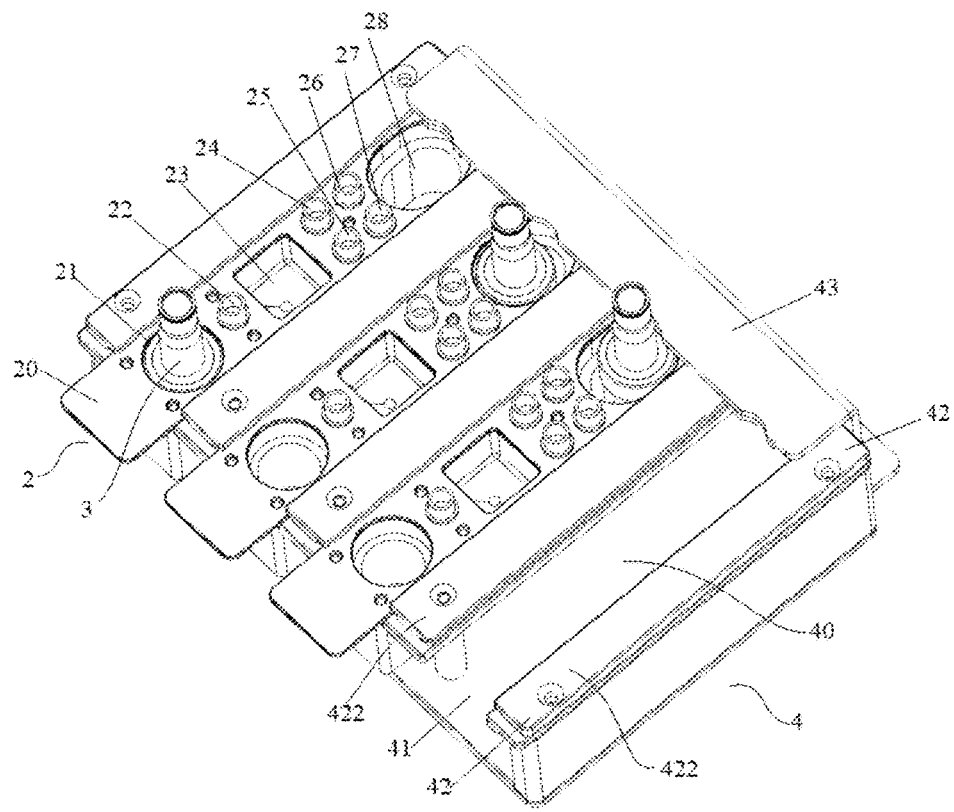
FIGS. 5, 6, and 7 are respectively stereograms of the tray apparatus, wherein the upper plate and baffle plate in FIG. 7 are not shown.

In this embodiment, the trap apparatus 4 is mounted with a plurality of kits 2 arranged side by side in the left-right direction (as shown in FIG. 3, four kits can be mounted in the tray apparatus 4 at a time). As shown in FIG. 5, each kit 2 comprises a kit body 20, and the kit body 20 is provided with a waste liquid collection well 21 for inserting the chip clamp 3 and storing waste liquid, one or more reagent wells for storing reagents, and a chip return well 28 for depositing the chip clamp 3. The reagent well(s) specifically comprise a fixation solution well 22 for storing a fixation solution, a buffer solution well 23 for storing a buffer solution, a primary antibody well for storing a primary antibody, a second antibody well 26 for storing a secondary antibody, and a staining solution well 27 for storing a staining solution. Wherein, the primary antibody well specifically comprises a first primary antibody well 24 for storing a first primary antibody and a second primary antibody well 25 for storing a second primary antibody. The waste liquid collection well 21 and the chip return well 28 are respectively stepped wells with an upper hole diameter larger than a lower hole diameter, so as to match the shape of the chip clamp 3 and facilitate the insertion of the chip clamp 3. The chip return well 28 is a long well or a kidney-shaped well, and the length direction of the chip return well 28 is consistent with the length direction of the kit body 20. In this kit 2, the reagents and the chip clamp 3 are used for one-time use in the kit 2; multiple steps such as pipetting, sorting, and waste liquid treating can be processed; internal operations have low risk of contamination. Moreover, the kit 2 is designed as a whole, and the reagents in the reagent wells are stored separately without mixing, adapting to different use concentrations in different steps, and can be adapted to long-term storage. The reagent storage area and the kit 2 are an integral structure, so that the reagent storage is more stable and the operation is more stable. The waste liquid collection well 21 in this kit 2 is both the mounting position of the chip clamp 3 and the waste liquid treatment position, which saves the space of the kit 2 and does not require the operator to prepare additional containers to collect the waste liquid.

The waste liquid collection well 21 and the chip return well 28 are respectively located on the front and rear end portions of the kit body 20, and the fixation solution well 22, the buffer solution well 23 and the primary antibody well are successively arranged between the waste liquid collection well 21 and the chip return well 28, and the secondary antibody well 26 and the staining solution well 27 are arranged side by side in the left-right direction between the primary antibody well and the chip return well 28. In other words, the waste liquid collection well 21, the fixation solution well 22, the buffer solution well 23, the primary antibody well, the secondary antibody well 26 or the staining solution well 27, and the chip return well 28 are arranged in an interval along the length direction of the kit body 20 (that is, the front-rear direction). In this embodiment, the waste liquid collection well 21 is used to store samples (such as blood, urine, tissue fluid, spinal fluid and other body fluids), reagents, etc. discharged from the microfluidic chip; the fixation solution well 22 stores a fixation solution; the buffer solution well 23 stores PBS buffer; the first primary antibody well 24 stores the primary antibody A, the second primary antibody well 25 stores the primary antibody B; the secondary antibody well 26 stores the secondary antibody; the staining solution well 27 stores DAPI staining solution.

Figure 8:
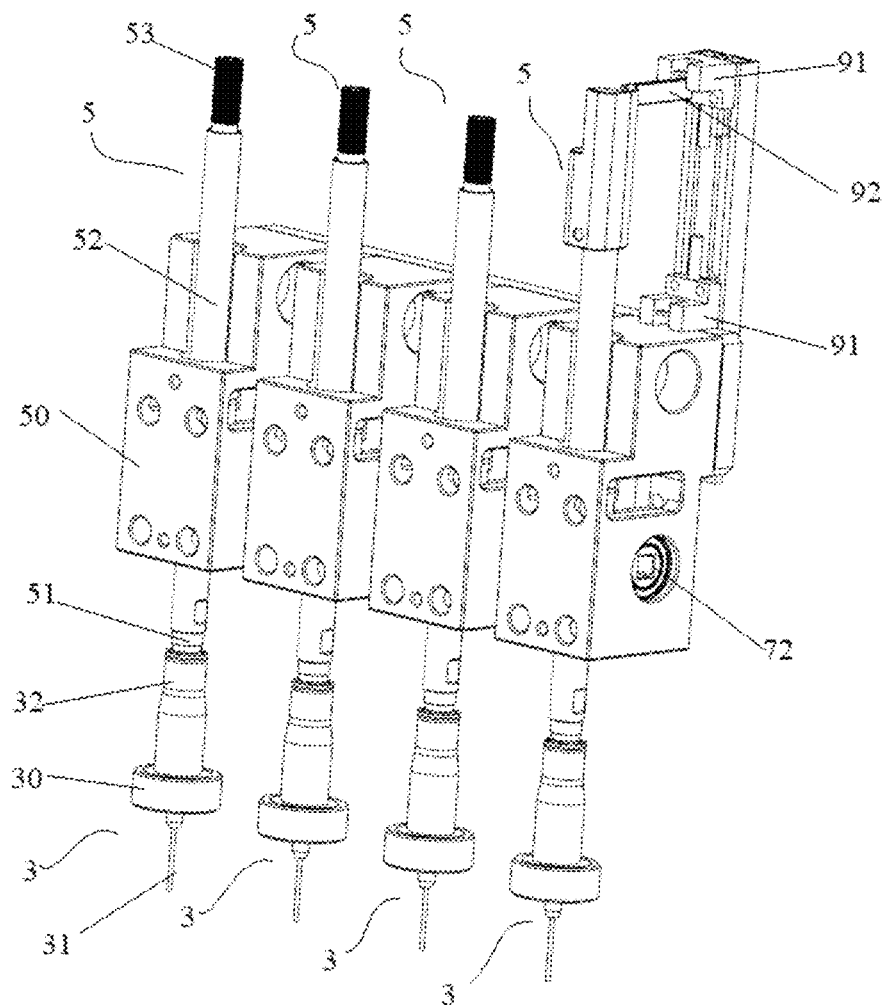
FIG. 8 is a stereogram of a mechanical arm.

Referring to FIG. 8, each chip clamp 3 comprises a clamp body 30 and a flow guide tube 31 for liquid suction and discharge, the microfluidic chip is mounted in the inner cavity of the clamp body 30, and the flow guide tube 31 extends downward from the clamp body 30 and communicates with the inner cavity. The upper portion of the clamp body 30 has a cylinder portion 32 into which the lower end portion of the mechanical arm 5 is inserted. The cylinder portion 32 is hollow and communicates with the inner cavity of the clamp body 30. The clamp body 30 of the chip clamp 3 can store samples, and the flow guide tube 31 at the lower portion can discharge waste liquid and suck reagents, guide the waste liquid flowing through the microfluidic chip and suck reagents to flow through the microfluidic chip for incubation or cleaning, etc., can facilitate the microfluidic chip to capture target cells or biomolecules in the sample and can easily absorb or discharge reagents.

Figure 6:
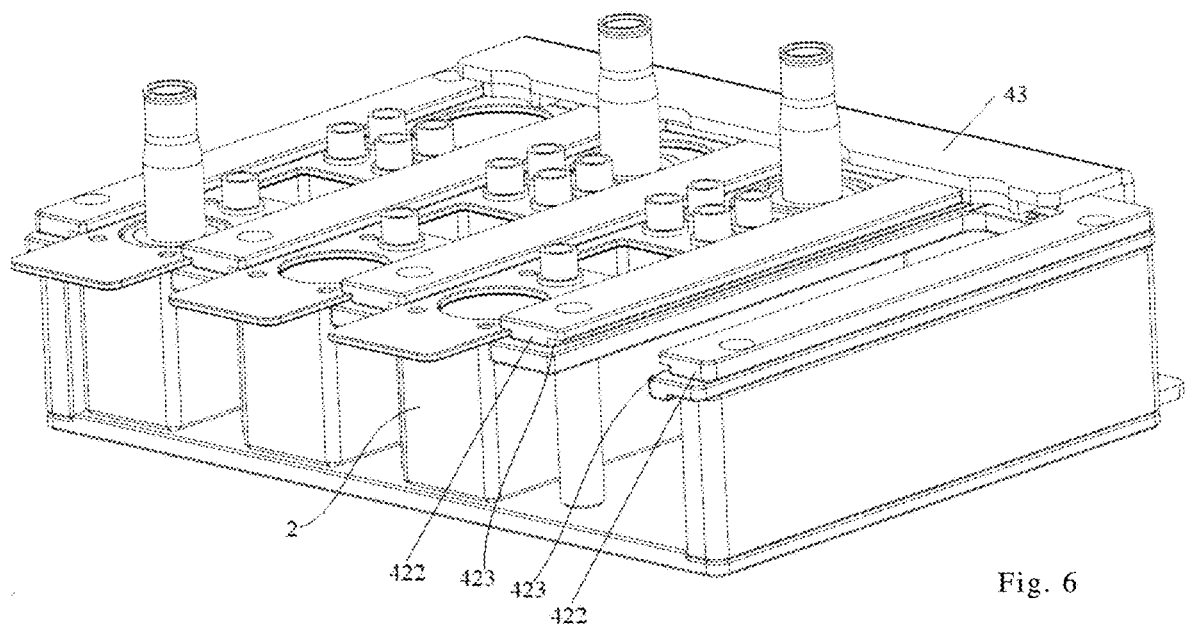
Figure 7:
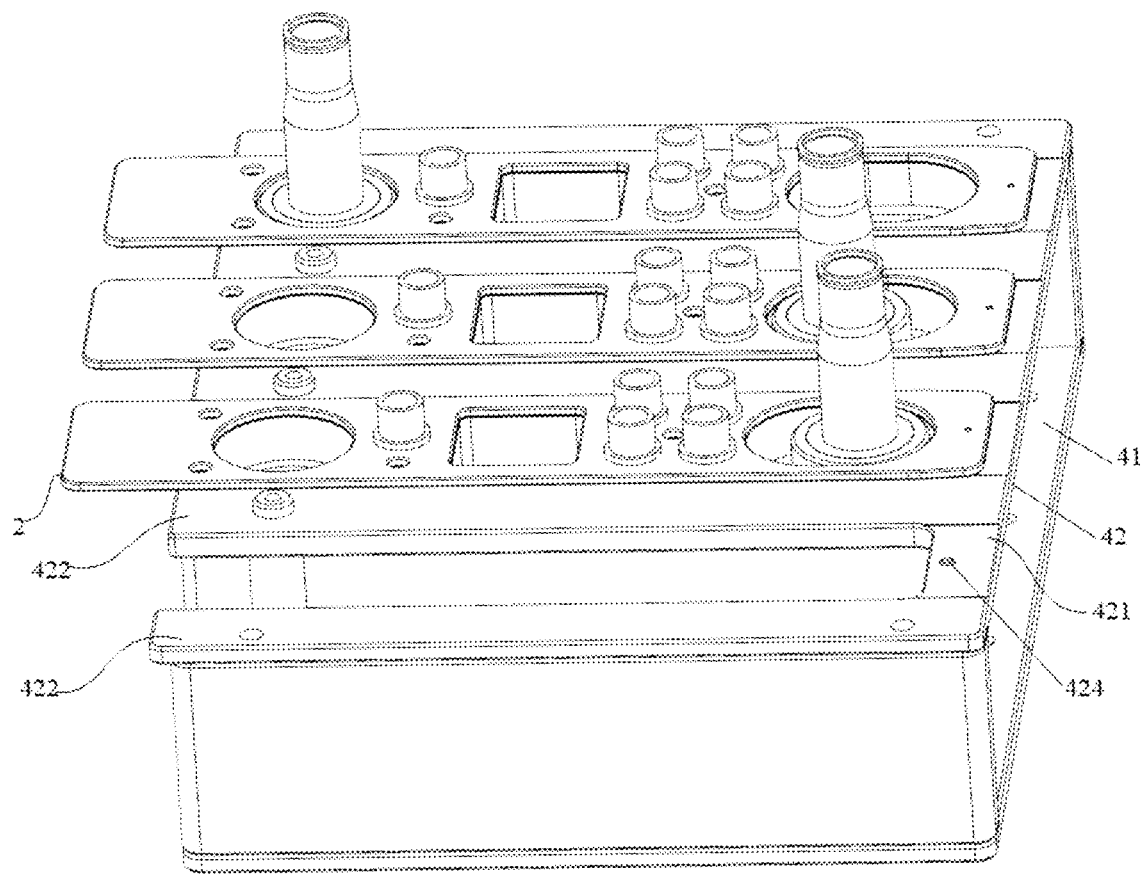

The microfluidic sample processing device has a waste liquid collecting state, a chip returning state and a pipetting state. When the microfluidic sample processing device is in the waste liquid collecting state, the chip clamp 3 is inserted into the waste liquid collection well 21 of the kit 2, the clamp body 30 is located on the upper portion of the stepped hole, and the flow guide tube 31 is inserted into the lower portion of the stepped hole, as shown in FIG. 5 to FIG. 7 where the leftmost chip clamp 3 is located. When the microfluidic sample processing device is in the chip returning state, the chip clamp 3 is inserted into the chip return well 28 of the kit 2, the clamp body 30 is located on the upper portion of the stepped hole, and the flow guide tube 31 is inserted into the lower portion of the stepped hole, as shown in FIG. 5 to FIG. 7 where the two chip clamps 3 in the middle are located. When the microfluidic sample processing device is in the pipetting state, the chip clamp 3 is separated from the waste liquid collection well 21, the chip clamp 3 is located above one of the reagent wells, and the flow guide tube 31 is inserted into the reagent well.

Specifically, as shown in FIG. 5 to FIG. 7, the tray apparatus 4 is provided with a plurality of mounting grooves 40 arranged side by side in the left-right direction, and each mounting groove 40 is provided with one kit 2. In this embodiment, the tray apparatus 4 comprises a bottom plate 41 and an upper plate 42 fixedly arranged on the bottom plate 41, the upper plate 42 comprises a left-right extending portion 421 and a plurality of front-rear extending portions 422 extending forward from the left-right extending portion 421, the plurality of front-rear extending portions 422 is arranged side by side and spaced in the left-right direction, and one mounting groove 40 with open front and upper sides is formed between any two adjacent front-rear extending portions 422. Each of the front-rear extending portions 422 is provided with a slot 423 extending in the front-rear direction, and the slots 423 on the two adjacent front-rear extending portions 422 are arranged opposite to each other, and the left and right edges of one kit 2 are inserted into two corresponding slots 423. The upper plate 42 is specifically formed by stacking upper and lower sheets, and the slots 423 are formed between the upper and lower sheets.

The upper plate 42 is provided with positioning mechanisms for locating the kits 2. In this embodiment, as shown in FIG. 7, the positioning mechanisms comprise upwardly extending locating protrusions 424 formed on the upper plate 42, and the kits are provided with recesses facing downward. When the kits are mounted in place, the positioning protrusions 424 are inserted into the recesses of the kits, and cooperate with the slots 423 on both sides to fix the kits in the mounting grooves 40 to prevent the kits from shaking. When mounting, the left and right side edges of one kit 2 are inserted into the slots 423 on both sides, and the kit 2 is pushed in from the front side of one mounting groove 40 until it gets stuck onto the positioning protrusion 424. Further, the tray apparatus 4 further comprises a baffle plate 43, and a part of the chip return well is located directly under the baffle plate 43. The baffle plate 43 is specifically fixed on the bottom plate 41 or the frame 1, and the baffle plate 43 is located above the upper plate 42 and partially shields the chip return wells 28 of the kits below, and is used to prevent the chip clamps 3 from being removed from the chip return wells 28. When the microfluidic sample processing device is in the waste liquid collecting state, the chip clamps 3 can be slidably inserted into the chip return wells 28 within which the chip clamps 3 is capable of sliding in the front-back direction. When returning the microfluidic chip, the chip clamp 3 is inserted downward from the front portion of the chip return well 28 into the chip return well 28 (as shown in FIG. 5 to FIG. 7 where the second chip clamp 3 from the left is located), and then is moved along the chip return well 28 to its rear portion (as shown in FIG. 5 to FIG. 7 where the third chip clamp 3 from the left is located), and is restricted in the chip return well 28 by the baffle plate 43, thereby detaching the chip clamp 3 from the mechanical arm 5.

In this embodiment, there is a plurality of mechanical arms 5, such as four as shown in FIG. 8. The plurality of mechanical arms 5 is arranged side by side in the left-right direction, and corresponds to the plurality of kits 2 below one to one, respectively. As shown in FIG. 8 to FIG. 11, each mechanical arm 5 comprises a housing 50, a lifting rod 52 passing through the housing 50 and capable of moving in the up-down direction, and a connecting head 51 arranged on the lower end portion of the lifting rod 52, and a joint 53 arranged at the upper end portion of the lifting rod 52. The joint 53 is used to communicate with the joint 53 of the negative pressure suction apparatus 6, the lifting rod 52 is hollow, and the negative pressure suction apparatus 6 provides the connecting head 51 with air pressure for suction or discharge.

Figure 9:
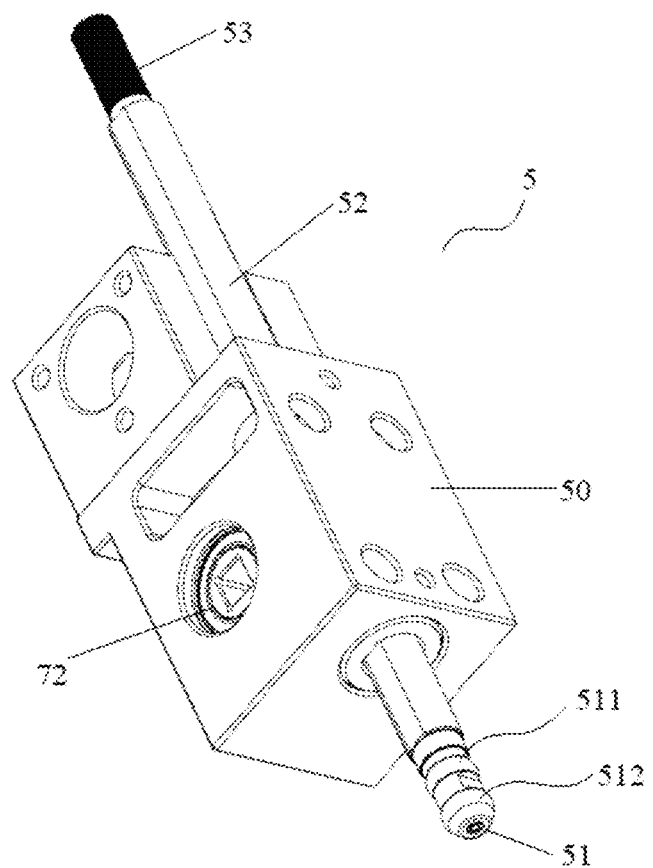
FIG. 9 is a schematic view of a single mechanical arm.
Figure 10:
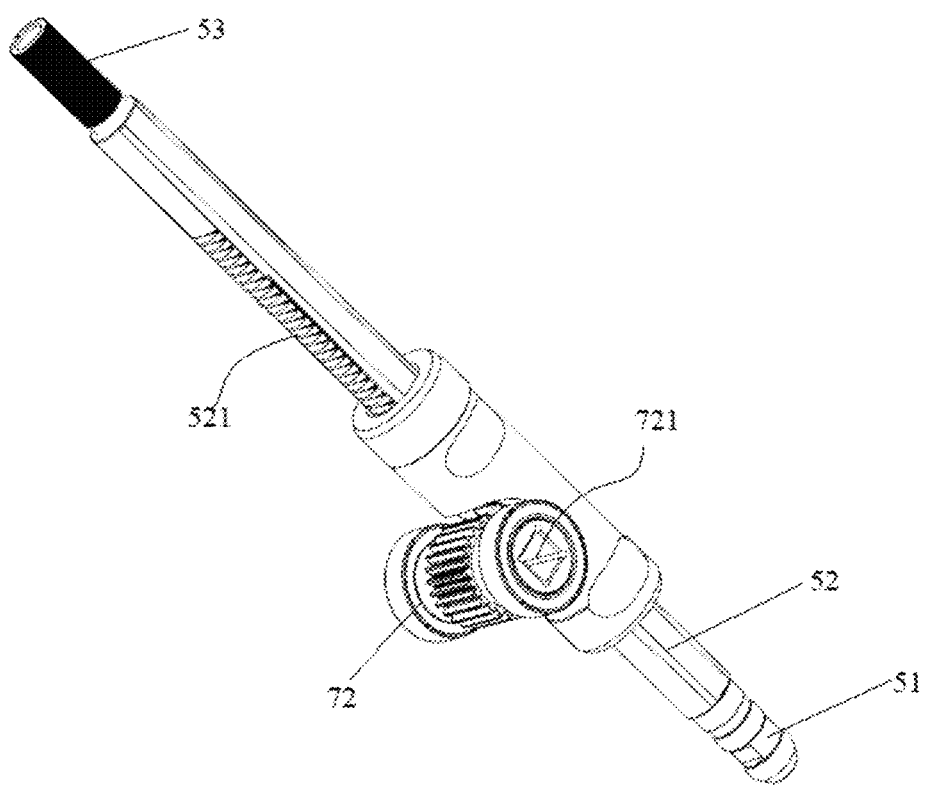
FIG. 10 is a schematic view of a single mechanical arm, wherein the housing is not shown.

As shown in FIG. 9, the connecting head 51 comprises a head body 30 and a first flange 511 and a second flange 512 that extend outwardly from the outer surface of the lower portion of the head body 30, the first flange 511 is located at a distance above the second flange 512, and the outer diameter of the first flange 511 is smaller than the outer diameter of the second flange 512.

The lower end portion of the connecting head 51 is generally in the shape of a gourd, and when it is inserted into the cylinder portion 32 of the chip clamp 3, the connection is relatively firm to prevent the chip clamp 3 from falling from the connecting head 51.

Figure 11:
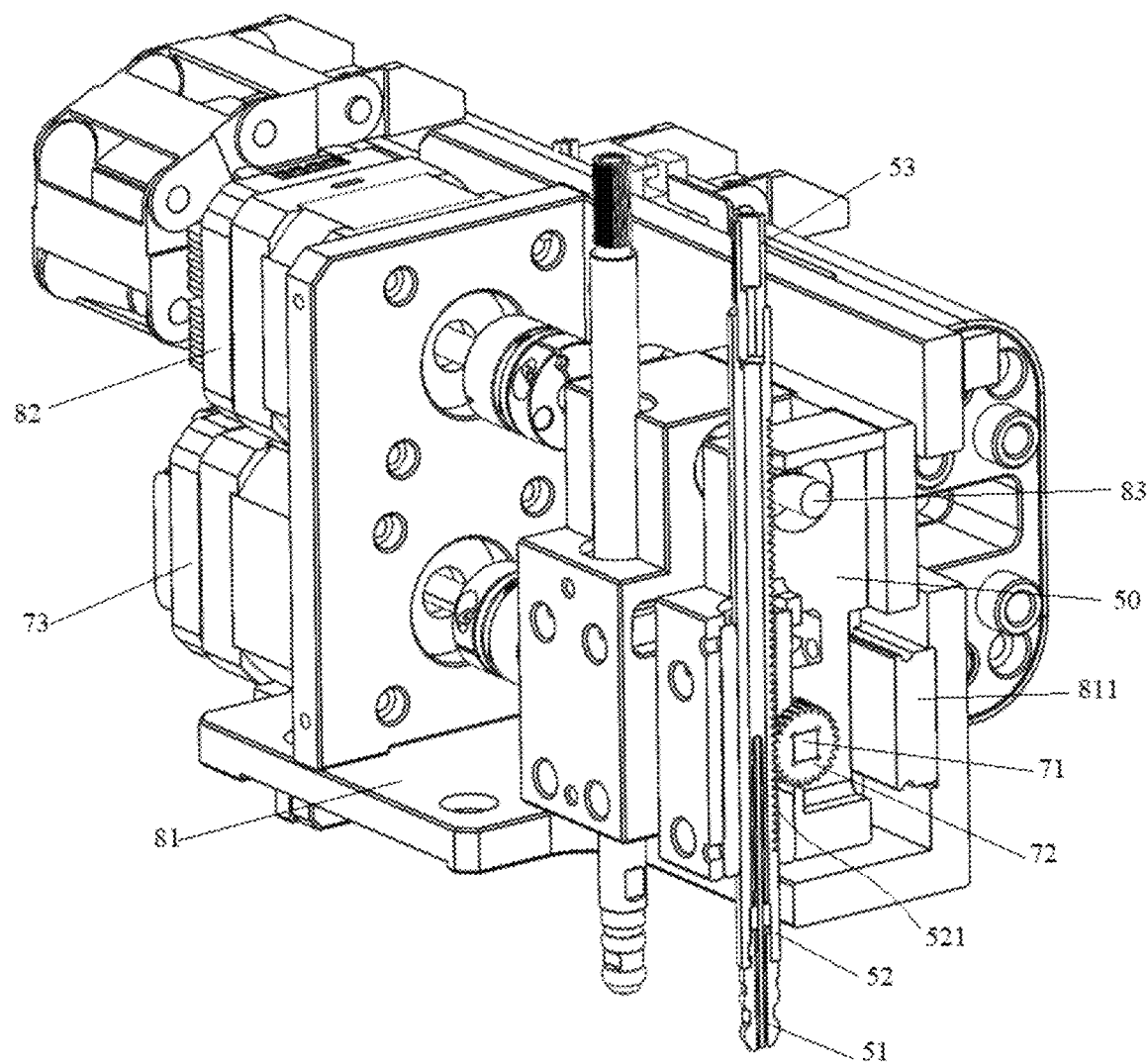
FIG. 11 is a partial cross-sectional view of the mechanical arm, the lifting apparatus and the translation apparatus.

As shown in FIG. 3, FIG. 4, FIG. 10, and FIG. 11, the lifting apparatus 7 comprises a lifting shaft assembly driven to rotate by a lifting power mechanism, one or more circles of teeth are formed on the outer circumferential surface of the lifting shaft assembly, the lifting rod 52 has a rack portion 521 extending in the up-down direction, and the rack portion 521 and the teeth on the lifting shaft assembly mesh with each other. Specifically, the above-mentioned lifting power mechanism is specifically a lifting motor 73, the lifting shaft assembly comprises a lifting shaft 71 driven to rotate by the lifting motor 73, and one or more gears 72 rotating with the lifting shaft 71, the gear(s) 72 are provided with polygonal hole(s), and the lifting shaft 71 is inserted in the polygonal holes and can allow the gear(s) 72 to move horizontally relative to the lifting shaft 71. The gear(s) 72 are arranged within the housing 50. The number of gears 72 mentioned above corresponds to the number of mechanical arms 5, that is, one gear 72 is arranged in the housing 50 of every mechanical arm 5. As shown in FIG. 11, the above-mentioned polygonal holes are specifically square holes 721, the cross-section of the above-mentioned lifting shaft 71 is correspondingly a square shape, the lifting shaft 71 extends in the left-right direction and successively passes through the square holes 721 on the gears 72 of the plurality of mechanical arms 5, and when the lifting shaft 71 is rotated, the gears 72 can be driven to rotate, and the lifting rods 52 can be driven to move up and down with the cooperation of the rack and gear. At the same time, when the mechanical arms 5 are subjected to a leftward or rightward force exerted by the translation apparatus 8, the gears 72 can be allowed to slide on the lifting shaft 71, the mechanical arms 5 can move in the left-right direction under the drive of the translation apparatus 8.

Figure 4:
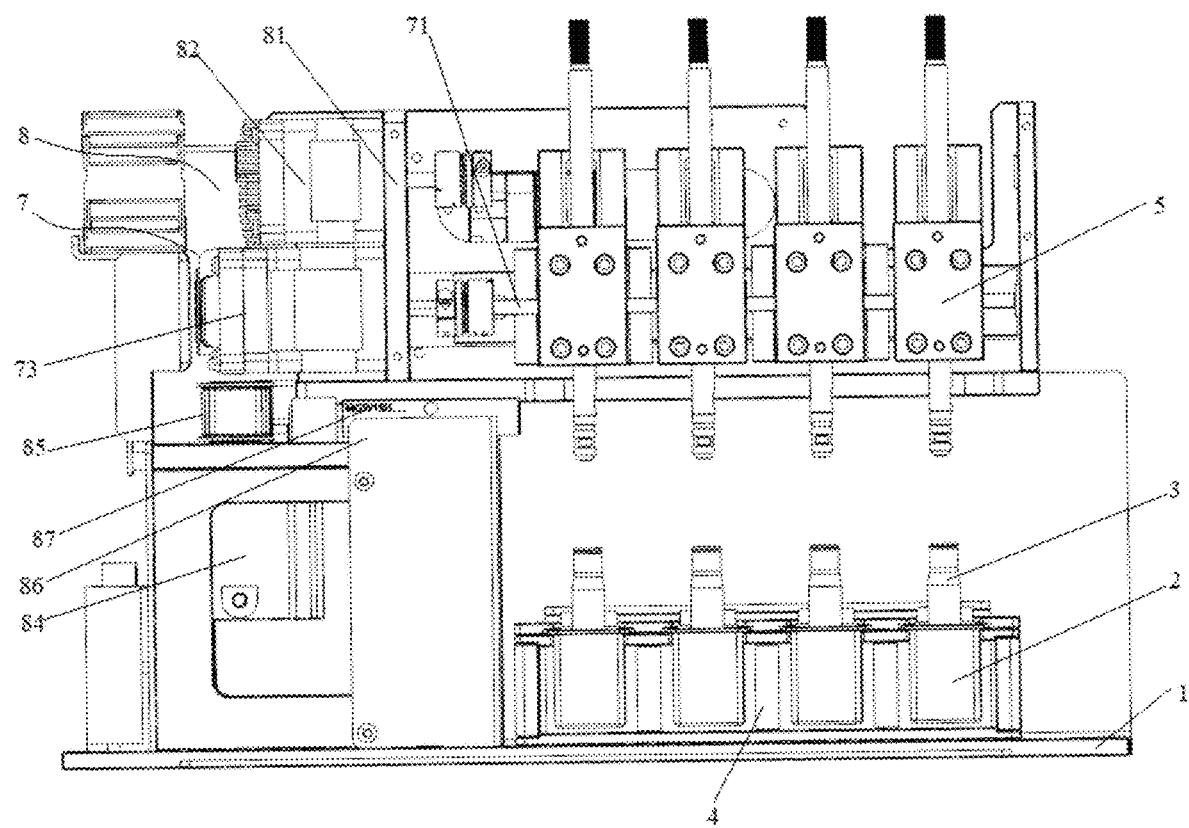
FIG. 4 is a front view of a microfluidic sample processing device according to an embodiment, wherein the shell is not shown.

As shown in FIG. 3, FIG. 4, and FIG. 11, the translation apparatus 8 comprises an x-direction assembly for driving the mechanical arms 5 to move in the left-right direction and a y-direction assembly for driving the mechanical arms 5 to move in the front-rear direction, wherein the mechanical arms 5 are arranged on the x-direction assembly, the x-direction assembly is arranged on the y-direction assembly, and the y-direction assembly is arranged on the frame 1. Specifically, the x-direction assembly comprises a mounting plate 81 and a screw rod 83 extending along the left-right direction, the screw rod 83 is rotatably arranged on the mounting plate 81 around its own axis, and the screw rod 83 passes through the housings 50 of the mechanical arms 5 and is threaded connected to the housings 50 of the mechanical arms 5. The mounting plate 81 is fixedly provided with a guide rail 811 extending in the left-right direction, and mechanical arms 5 are slidably arranged on the guide rail 811 in the left-right direction, specifically, the housings 50 of the mechanical arms 5 are connected to the guide rail 811 in a sliding fit. The x-direction assembly further comprises an x-direction motor 82 for driving the screw rod 83 to rotate. The screw rod 83 and the lifting shaft 71 are arranged in parallel, and the screw rod 83 is located above the lifting shaft 71, the screw rod 83 passes through the upper portions of the mechanical arms 5, and the lifting shaft 71 passes through the lower portions of the mechanical arms 5. The y-direction assembly comprises a sliding rail 86 extending in the front-rear direction and a sliding block 87 slidably disposed on the sliding rail 86, the sliding rail 86 is fixedly arranged on the frame 1, and the x-direction assembly is fixedly arranged on the sliding block 87. The y-direction assembly further comprises a y-direction motor 84 and a belt transmission mechanism 85 driven by the y-direction motor 84, and the belt transmission mechanism 85 is connected to the sliding block 87.

Figure 2A:
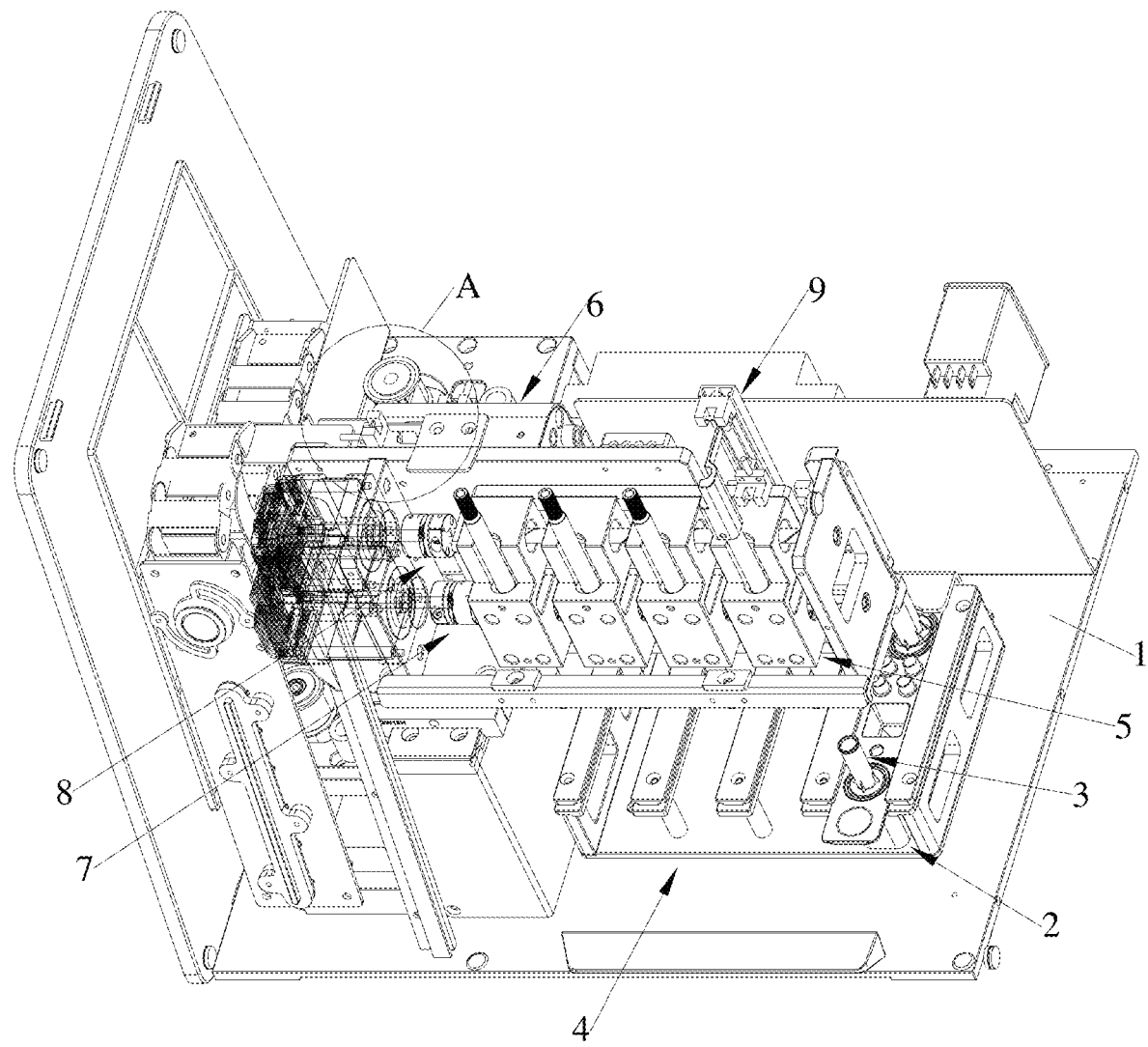
FIG. 2a is a schematic diagram of the internal structure of a microfluidic sample processing device according to an embodiment, wherein the shell is not shown.
Figure 2B:
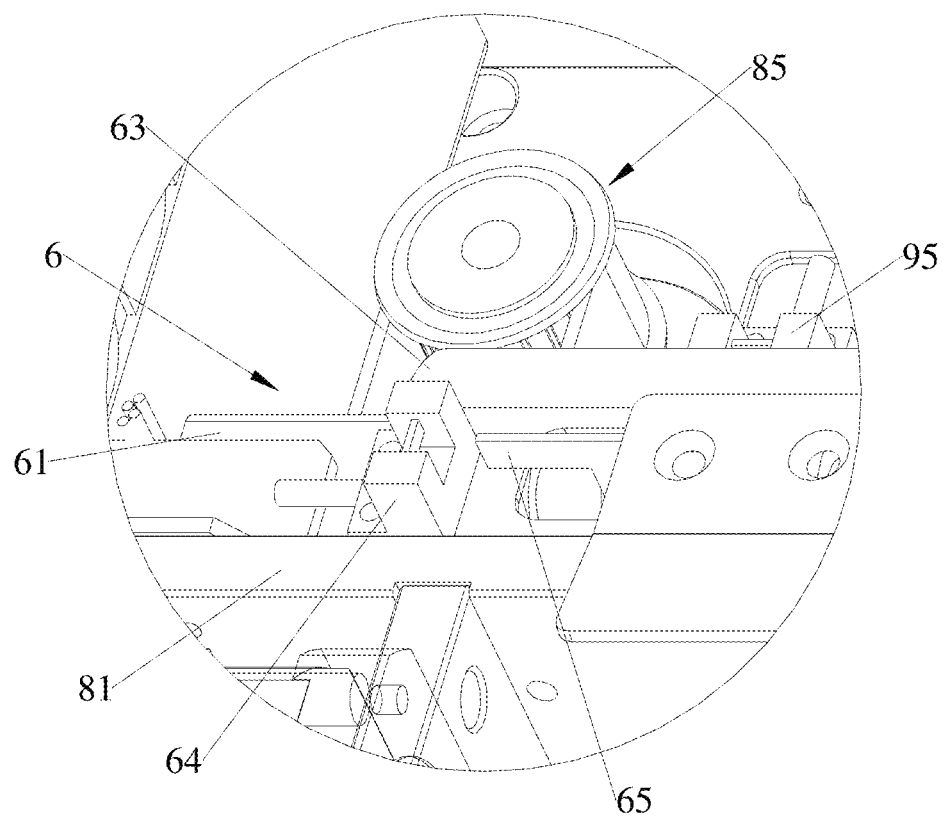
Figure 12:
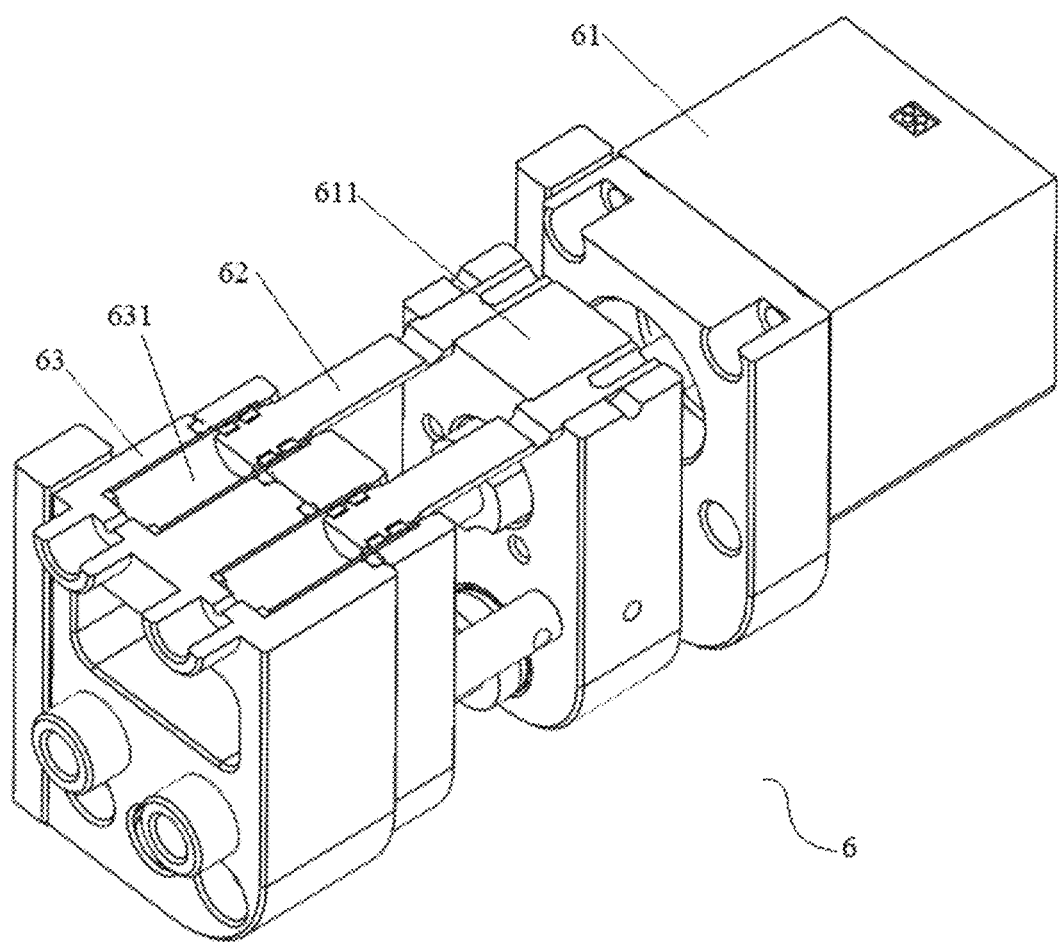
FIG. 12 is a cross-sectional view of the negative pressure suction apparatus.

As shown in FIG. 2b and FIG. 12, the negative pressure suction apparatus 6 comprises a piston 62 driven by a negative pressure motor 61 to reciprocate in a straight line and a piston shell 63 provided with a gas cavity 631, the piston shell 63 is fixedly arranged on the mounting plate 81, and the piston 62 is movably inserted in the gas cavity 631 of the piston shell 63. The negative pressure suction apparatus 6 further comprises a gas-guide tube (not shown), one end portion of the gas-guide tube is fixedly connected to the piston shell 63 and communicates with the gas cavity 631, and the other end portion of the gas-guide tube is fixedly connected to the mechanical arms 5. In this embodiment, there are a plurality of pistons 62, a plurality of gas cavities 631, and a plurality of gas-guide tubes, of which the numbers correspond to the number of the mechanical arms 5, respectively. That is to say, a plurality of mutually independent gas cavities 631 are opened in the piston shell 63, and pistons 62 are slidably provided with in every gas cavity 631, and when the negative pressure motor 61 drives the pistons 62 to reciprocate, the air pressure in the gas cavities 631 and the connecting heads 51 communicating with the gas cavities 631 through the air guide tube change accordingly, so that the reagent can be sucked or discharged. The negative pressure suction apparatus 6 uses the principle of the piston 62 to generate pressure to control the suction or discharge of the liquid in the closed state, and when the head is below the liquid surface, the piston 62 is moved backward to generate a negative pressure to achieve the purpose of suction, on the contrary, when there is liquid in the connecting head 51, the piston 62 is moved forward to generate a positive pressure to discharge the liquid. The front portion of each piston 62 is provided with a rubber pad, and the airtightness is increased by the rubber pad.

The negative pressure suction apparatus 6 further comprises a piston detection mechanism for monitoring the displacement of the piston 62. In this embodiment, as shown in FIG. 2b, the piston detection mechanism comprises a photoelectric sensor 64 fixedly arranged on the piston shell 63 and a baffle 65 that moves synchronously with the piston 62, and when the piston 62 moves to the maximum setting displacement, the baffle 65 moves to the position of the photoelectric sensor 64, and the photoelectric sensor 64 is triggered to send out a detection signal. The photoelectric sensor 64 of the piston detection mechanism is electrically connected to the controller through a wire, the negative pressure motor 61 is electrically connected to the controller through a wire, and when the photoelectric sensor 64 is triggered to send out a detection signal, the controller receives the detection signal and sends a control signal to the negative pressure motor 61 to stop running, the negative pressure motor 61 stops running in response to the control signal, and the piston 62 stops moving. Specifically, the negative pressure motor 61 is mounted on the piston shell 63, the motor shaft of the negative pressure motor 61 is connected to a push plate 611 and drives the push plate 611 to reciprocate in a straight line, and the plurality of pistons 62 is fixedly arranged on the push plate 611, is driven by the push plate 611 to move synchronously, and the baffle 65 is fixedly arranged on the push plate 611.

The microfluidic sample processing device further comprises a fault detection apparatus 9. The fault detection apparatus 9 comprises at least one detecting unit, each detecting unit comprises a pair of spaced photoelectric sensors and a baffle that moves with the connecting head 51, and the baffle is arranged between the pair of photoelectric sensors. The baffle is specifically a metal baffle. Specifically, in this embodiment, the number of detecting units is three, namely the first detecting unit, the second detecting unit, and the third detecting unit. The first detecting unit is used to detect the movement distance of the connecting head 51 in the up-down direction, the second detecting unit is used to detect the movement distance of the connecting head 51 in the left-right direction, and the third detecting unit is used to detect the movement distance of the connecting head 51 in the front-rear direction. As shown in FIG. 8, the first detecting unit comprises a pair of first photoelectric sensors 91 and one first baffle 92, this pair of first photoelectric sensors 91 are arranged close to the mechanical arms 5, specifically, are fixedly arranged on the housing 50 of one mechanical arm 5, the two are arranged in the up-down direction and have a first interval, the first interval is greater than the maximum setting stroke of the lifting rod 52 moving in the up-down direction, and the first baffle 92 is fixedly connected to the lifting rod 52 and located between this pair of first photoelectric sensors 91. As shown in FIG. 3, the second detecting unit comprises a pair of second photoelectric sensors 93 and one second baffle 94, this pair of second photoelectric sensors 93 are arranged close to the mechanical arms 5, specifically, are fixedly arranged at a position on the mounting plate 81 close to the mechanical arms 5, the two are arranged in the left-right direction and have a second interval, the second interval is greater than the maximum setting stroke of the mechanical arms 5 moving in the left-right direction, and the second baffle 94 is fixedly connected to one of the mechanical arms 5 (specifically the housing 50 of this mechanical arm 5) and located between this pair of second photoelectric sensors 93. As shown in FIG. 2b and FIG. 3, the third detecting unit comprises a pair of third photoelectric sensors 95 and one third baffle (not shown), this pair of third photoelectric sensors 95 are fixedly arranged at a position on the frame 1 close to the sliding block 87, specifically, arranged beside the sliding rail 86, the two are arranged in the front-rear direction at a third interval, the third interval is greater than the maximum setting stroke of the mechanical arms 5 moving in the front-rear direction, and the third baffle is fixedly connected to the sliding block 87 and located between this pair of third photoelectric sensors 95.

The fault detection apparatus 9 further comprises a controller, the controller is electrically connected to each of the photoelectric sensors, and the controller is used to control the mechanical arms 5 to stop moving after any one of the photoelectric sensors is triggered. The fault detection apparatus 9 further comprises a fault indicator light 96, the controller is electrically connected to the fault indicator light 96, and the controller is also used to control the fault indicator light 96 to switch the light color after any one of the photoelectric sensors is triggered. Specifically, the controller is electrically connected to the pair of first photoelectric sensors 91, the pair of second photoelectric sensors 93, and the pair of third photoelectric sensors 95 through wires, respectively, and the controller is also electrically connected to the lifting motor 73, the x-direction motor 82 and the y-direction motor 84 through wires, respectively. When the mechanical arms 5 are moved in the up-down direction beyond the maximum setting displacement, the first baffle 92 moves to one first photoelectric sensor 91, triggers this first photoelectric sensor 91 to send out a fault signal, and the controller receives the fault signal and sends a first control signal to the lifting motor 73, the x-direction motor 82 and the y-direction motor 84 to stop running, at the same time, the controller also sends a second control signal for switching the indication color to the fault indicator light 96, and in response to the first control signal, the lifting motor 73, the x-direction motor 82, and the y-direction motor 84 stop running, and in response to the second control signal, the color of the fault indicator light 96 changes from green to red. As shown in FIG. 1, the fault indicator light 96 is specifically arranged on the shell 10, including a long strip of LED lights; when the microfluidic sample processing device is operating normally, the color of the fault indicator light 96 is green; when the movement of the mechanical arms 5 in either direction exceeds the maximum setting stroke, it is judged that the microfluidic sample processing device is faulty, each motor stops running, the mechanical arms 5 stop moving, and the fault indicator light 96 is red. Avoid the wrong operation of the mechanical arms 5 to damage the sample and the machine itself.

The detection principle of the photoelectric sensors adopted in this embodiment is: when the baffles move to the photoelectric detection position, the detection light of the photoelectric sensors is blocked, so that the photoelectric sensors are triggered. The photoelectric sensors are typically infrared sensors, and the infrared sensors will be triggered when the baffles block the infrared rays emitted by the infrared sensors.

In some other embodiments, the fault detection apparatus 9 further comprises a sound alarm apparatus, the controller is electrically connected to the sound alarm apparatus, and the controller is also used to control the sound alarm apparatus to emit a warning sound after any one of the photoelectric sensors is triggered.

In the fault detection apparatus 9, there is still a small distance between the normal operating range of the mechanical arms 5 and the photoelectric sensors, which greatly reduces the probability of the photoelectric sensors being falsely triggered. Once the mechanical arms 5 fail and any one of the baffles reach the position of the photoelectric sensor, the mechanical arms 5 will immediately stop moving, which effectively improves the safety of the machine. The operation is simple, and the fault response is intuitive.

The working process of the microfluidic sample processing device is:

1. the kits 2 are loaded into the mounting grooves 40 of the tray apparatus 4, the translation apparatus 8 drives the mechanical arms 5 to move horizontally so that each connecting head 51 is directly above the corresponding chip clamp 3, and the lifting apparatus 7 drives the mechanical arms 5 to lift so as to insert the lower end portions of the connecting heads 51 into the cylinder portions 32 of the chip clamps 3, to load the chip clamp 3 on the connecting head 51; at this time, the chip clamps 3 are initially located in the waste liquid collection wells 21, and the samples (body fluid, such as blood, urine, tissue fluid, spinal fluid, etc.) are stored in the upper sections of the chip clamps 3, after the mechanical arms are inserted into the cylinder portions 32, the entire chip clamps 3 can be moved, and when inserted, the negative pressure suction apparatus 6 provides positive pressure to push the samples into the inner cavities of the chip clamps 3 and flow through the microfluidic chips for cell capture, the waste liquid flows out from the flow guide tubes 31 at the lower ends of the chip clamps 3 and stays in the waste liquid collection wells 21, the waste liquid involved in the subsequent operations is deposited into the waste liquid collection wells 21.

2. The lifting apparatus 7 drives the mechanical arms to move upward to remove the chip clamps 3 out of the waste liquid collection wells 21 as a whole; the y-direction motor 84 of the translation apparatus 8 moves, and the mechanical arms 5 drive the chip clamps 3 to move above the fixation solution wells 22; the lifting apparatus 7 runs, and the mechanical arms 5 drive the chip clamps 3 to move downward, to insert the flow guide tubes 31 into the fixation solution wells 22, and the negative pressure suction apparatus 6 provides negative pressure to make the flow guide tubes 31 to suck the fixation solutions in the fixation solution wells 22, the fixation solutions pass through the chips from bottom to top to fix the cells captured on the chips; the y-direction motor 84 of the translation mechanism moves, the mechanical arms 5 move back to above the waste liquid collection wells 21, and the negative pressure suction apparatus 6 provides positive pressure to remove the fixation solution to the waste liquid collection wells 21, and the waste liquid treatment in the subsequent steps is the same here.

3. The mechanical arms 5 control the chip clamps 3 to move to above the buffer solution wells 23, insert the flow guide tubes 31 into the buffer solution wells 23, and suck the PBS buffer solution, clean the chips, and then the mechanical arms 5 move back to above the waste liquid collection wells 21, and the waste liquid is processed to the waste liquid collection wells 21, repeat 2 times. 4. The mechanical arms 5 control the chip clamps 3 to move to above the first primary antibody wells 24 successively, and insert the flow guide tubes 31 into the first primary antibody wells 24 to suck in the primary antibody A, then the chips are incubated for 60 minutes with the primary antibody A; and after discharging the waste liquid from the waste liquid collection wells 21, the mechanical arms 5 return to the buffer solution wells 23, to wash 2 times, and move to the second primary antibody wells 25, then the chips are incubated for 60 minutes with the primary antibody B; and after discharging the waste liquid from the waste liquid collection wells 21, the mechanical arms 5 return to the buffer solution wells 23, to wash 2 times, and move to the secondary antibody wells 26, then the chips are incubated for 60 minutes with the secondary antibody; and after discharging the waste liquid from the waste liquid collection wells 21, the mechanical arms 5 return to the buffer solution wells 23, to wash 2 times, and move to the staining solution wells 27, then the chips are stained for 5 minutes; and after discharging the waste liquid from the waste liquid collection wells 21, the mechanical arms 5 return to the buffer solution wells 23, to wash 2 times.

5. The translation apparatus 8 moves to make the mechanical arms drive the chip clamps 3 to the front portions of the chip return wells 28; the lifting apparatus 7 moves, and the mechanical arms 5 drive the chip clamps 3 to move downward and insert into the front portions of the chip return wells; the y-direction motor 84 of the translation apparatus 8 moves, and the mechanical arms 5 drive the chip clamps 3 to move in the chip return wells to the rear portions of the chip return wells, at this time, a part of the chip clamps 3 is located directly under the baffle plate 43; the lifting apparatus 7 moves, and the mechanical arms 5 moves upward, and the chip clamps 3 are blocked by the baffle plate 43 and stay in the chip return wells, so that the chip clamps 3 are separated from the connecting heads 51.

The microfluidic sample processing device of the present disclosure can integrate the functions of cell or biomolecule capturing, immobilization, washing, antibody incubation, staining, etc., automatically realize the above-mentioned series of processing of microfluidic samples, reduce manual intervention, and has a higher degree of automation, to improve the processing efficiency; and it is also possible to perform simultaneous operations on multiple chip clamps 3 at the same time, which facilitates parallel testing and further improves processing efficiency; in addition, the structure is compact and the layout is reasonable, which reduces the space occupied by the device. The embodiments described above are only for illustrating the technical concepts and features of the present disclosure, are preferred embodiments, and are intended to make those skilled in the art being able to understand the present disclosure and thereby implement it, and should not be concluded to limit the protective scope of this disclosure.

I claim:

1. A microfluidic sample processing device, comprising:
   a tray apparatus, for accommodating a reagent and a chip clamp for mounting a microfluidic chip;
   a mechanical arm, having a connecting head for connecting the chip clamp, a gas flow channel for communicating with an inner cavity of the chip clamp being arranged in the connecting head;
   a negative pressure suction apparatus, for providing negative pressure to the gas flow channel of the connecting head;
   a lifting apparatus, for driving the connecting head to rise and fall to connecting the chip clamp or make the chip clamp insert into or separate from the reagent; and
   a translation apparatus, for driving the connecting head to move to above the chip clamp or above the reagent;
   wherein, the tray apparatus is positioned below the mechanical arm, and the mechanical arm is arranged on the translation apparatus and is connected to the lifting apparatus,
   wherein one or more kits are mounted on the tray apparatus, each kit comprises a kit body, and the kit body is provided with a waste liquid collection well for inserting the chip clamp and storing waste liquid and one or more reagent wells for storing reagents, and
   wherein the kit body is further provided with a chip return well for depositing the chip clamp, the tray apparatus further comprises a baffle plate, and a part of the chip return well is located directly under the baffle plate.

2. The device according to claim 1, wherein the tray apparatus is provided with one or more mounting grooves, and each mounting groove is used to arrange one kit; the tray apparatus comprises a bottom plate and an upper plate fixedly arranged on the bottom plate, the upper plate comprises a left-right extending portion and a plurality of front-rear extending portions, the plurality of front-rear extending portions are spaced apart from each other, and one mounting groove with open front and upper sides is formed between any two adjacent front-rear extending portions.

3. The device according to claim 2, wherein each of the front-rear extending portions is provided with a slot, and the slots on the two adjacent front-rear extending portions are arranged opposite to each other, and two edges of one kit are inserted into two corresponding slots.

4. The device according to claim 1, wherein the chip return well is a long hole or a kidney-shaped hole.

5. The device according to claim 1, wherein the upper plate is provided with a positioning mechanism for positioning the kit(s).

6. The device according to claim 5, wherein the positioning mechanism comprises an upwardly extending positioning protrusion formed on the upper plate.

7. The device according to claim 1, wherein the chip clamp comprises a clamp body and a flow guide tube for liquid suction and discharge, the clamp body has an inner cavity for mounting the microfluidic chip, and the flow guide tube extends downwardly from the clamp body and communicates with the inner cavity; and the clamp body has a cylinder portion for the connecting head to insert into.

8. The device according to claim 1, wherein the device comprises a plurality of mechanical arms, each of the plurality of the mechanical arms comprises a connecting head, a housing and a lifting rod passing through the housing and capable of moving in an up-down direction, the lifting rod is hollow, and an upper end portion of the lifting rod is provided with a joint communicating with the negative pressure suction apparatus, and the connecting head is fixedly arranged at a lower end portion of the lifting rod.

9. The device according to claim 8, wherein the lifting apparatus comprises a lifting shaft assembly driven to rotate by a lifting power mechanism, one or more circles of teeth are formed on an outer circumferential surface of the lifting shaft assembly, the lifting rod has a rack portion extending in the up-down direction, and the rack portion and the teeth on the lifting shaft assembly mesh with each other.

10. The device according to claim 8, wherein the lifting shaft assembly comprises a lifting shaft driven to rotate by the lifting power mechanism and one or more gears rotating with the lifting shaft, the gear(s) are provided with polygonal hole(s), and the lifting shaft is inserted in the polygonal hole and allow the gear(s) to move horizontally relative to the lifting shaft.

11. The device according to claim 10, wherein the translation apparatus comprises a screw rod driven to rotate by a motor, and the screw rod passes through the plurality of the mechanical arms and is threaded connected to the housings of the plurality of the mechanical arms.

12. The device according to claim 11, wherein the plurality of the mechanical arms are driven to lift synchronously by one lifting shaft, and the plurality of the mechanical arms are driven to translate synchronously by one screw rod.

13. The device according to claim 1, wherein the negative pressure suction apparatus comprises a piston driven by a negative pressure motor to reciprocate in a straight line and a piston shell provided with a gas cavity, and the piston is inserted in the gas cavity of the piston shell; the negative pressure suction apparatus further comprises a gas-guide tube, one end portion of the gas-guide tube is fixedly connected to the piston shell and communicates with the gas cavity, and the other end portion of the gas-guide tube is fixedly connected to the mechanical arm.

14. The device according to claim 1, wherein the translation apparatus comprises an x-direction assembly for driving the mechanical arm to move in the left-right direction and a y-direction assembly for driving the mechanical arm to move in the front-rear direction.

15. The device according to claim 14, wherein the mechanical arm is arranged on the x-direction assembly, the x-direction assembly is arranged on the y-direction assembly, and the y-direction assembly is arranged on a frame.

16. The device according to claim 15, wherein the x-direction assembly comprises a mounting plate and a screw rod extending along the left-right direction, the screw rod is rotatably arranged on the mounting plate around its own axis, and the screw rod passes through the mechanical arm and is threaded connected to the mechanical arm; and/or the y-direction assembly comprises a sliding rail extending in the front-rear direction and a sliding block slidably disposed on the sliding rail, the sliding rail is fixedly arranged on the frame, and the x-direction assembly is arranged on the sliding block.

17. The device according to claim 1, wherein the microfluidic sample processing device further comprises a fault detection apparatus, the fault detection apparatus comprises at least one detecting unit, each of the detecting unit comprises a pair of spaced photoelectric sensors and a baffle that moves with the mechanical arm, and the baffle is arranged between the pair of photoelectric sensors; the fault detection apparatus further comprises a controller, the controller is electrically connected to each of the photoelectric sensors, and the controller is for controlling the mechanical arm to stop moving after any one of the photoelectric sensors is triggered.

18. The device according to claim 17, wherein the fault detection apparatus further comprises a fault indicator light, the controller is electrically connected to the fault indicator light, and the controller is also used to control the fault indicator light to switch the light color after any one of the photoelectric sensors is triggered; and/or the fault detection apparatus further comprises a sound alarm apparatus, the controller is electrically connected to the sound alarm apparatus, and the controller is also used to control the sound alarm apparatus to emit an alarm sound after any one of the photoelectric sensors is triggered.

* * * * *